May 13, 1969  A. E. LIGHT  3,443,376
ENGINE CONTROL SYSTEM AND TORQUE METER THEREFOR
Filed Aug. 4, 1967  Sheet 1 of 2
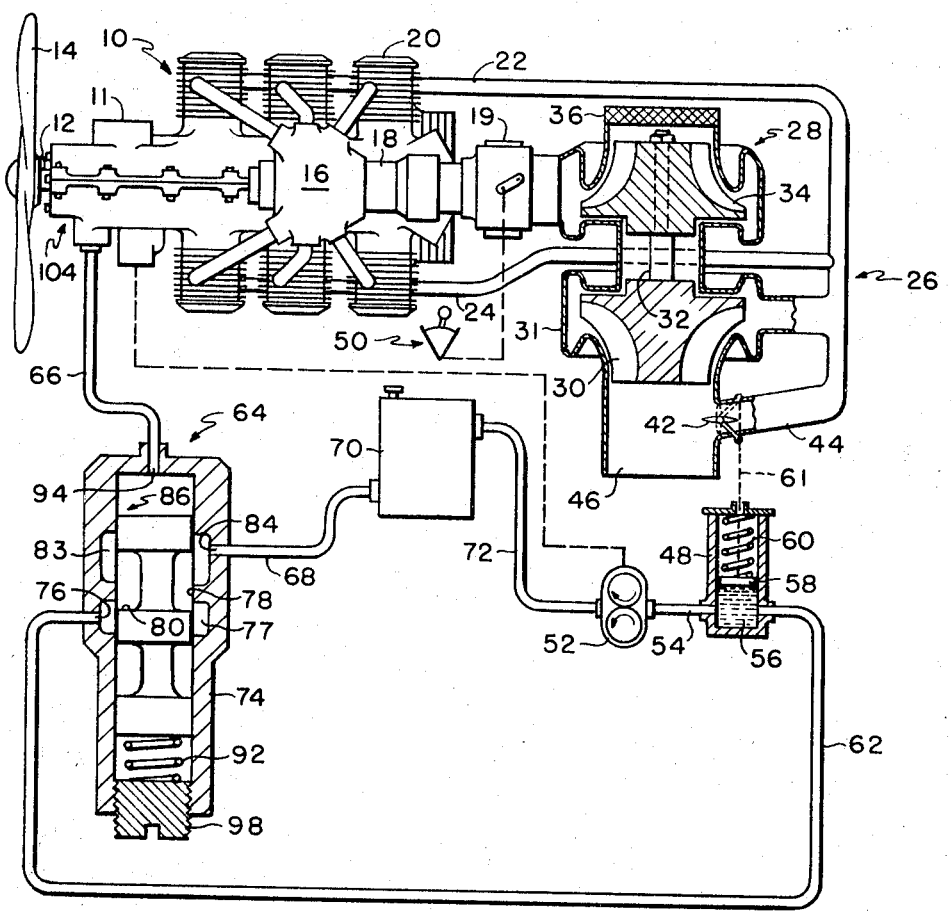
Fig 1
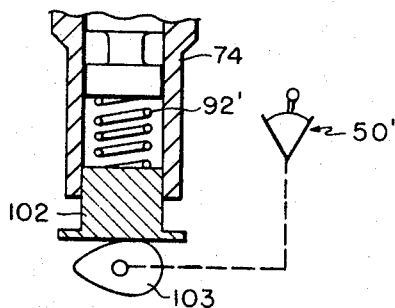
Fig 2
INVENTOR.
ALLEN E. LIGHT
BY 
ATTORNEYS.

INVENTOR.
ALLEN E. LIGHT

United States Patent Office 3,443,376
Patented May 13, 1969

3,443,376
ENGINE CONTROL SYSTEM AND TORQUE METER THEREFOR
Allen E. Light, Williamsport, Pa., assignor to Arco Corporation, Williamsport, Pa., a corporation of Delaware
Filed Aug. 4, 1967, Ser. No. 658,540
Int. Cl. F02b 37/08, 41/10; F02m 7/00
U.S. Cl. 60—13                                      6 Claims

ABSTRACT OF THE DISCLOSURE

The disclosure illustrates a control system for a turbocharger which pressurizes inlet air of an aircraft internal combustion engine to compensate for a loss in power at increased altitudes. The control system comprises a novel torque meter incorporated in the engine power train which provides a signal to a device that controls the rate of operation of the turbocharger and the degree of pressurization of the engine inlet air. The use of torque output as a parameter to control turbocharger operation enables a more precise and rapid control of power.

---

The present invention relates to engine control systems and more particularly to control systems for reciprocating engines such as the type used for aircraft propulsion.

In recent years, the performance, efficiency and utility of small aircraft has been greatly enhanced by the use of a turbocharger with the aircraft engines to provide a power increase and maintain sea-level power at substantial altitudes. A turbocharger generally comprises an interconnected turbine wheel and compressor journaled in a housing. The hot exhaust gases from the engine are directed across the turbine wheel thereby causing it to rotate and drive the compressor. The compressor receives ambient air and pressurizes it to increase its density for delivery to the inlet system of the engine. The turbocharger size may be selected to increase the power of the engine above a normally asperated engine or to merely compensate for loss in power with an increase in elevation.

Since the engine requires varying quantities of air, it is necessary to vary the rate of operation of the turbocharger. Generally this is accomplished by a bypass valve which diverts a controlled portion of the engine exhaust gases around the turbine wheel to control its speed and thus the rate of pressurization of the inlet air. It is a present practice to automate the control of turbocharger operation by regulating the pressure of the air delivered to the engine by the compressor to a pressure level which is required for operation of the engine at its maximum power output. While this arrangement provides a generally effective means of automatically maintaining engine power at increased elevation, it also generates a number of problems. One of the problems of such an arrangement is experienced when the output of the engine is decreased below its maximum rate of operation. The turbocharger is still controlled to maintain maximum pressure and the air delivered to the engine is overpressurized. The overpressurization of the inlet air results in a loss of efficiency in addition to raising induction system temperatures which makes the engine more susceptible to detonation.

Another problem in using inlet air pressure to control turbocharger operation is that engine power, while maintained at altitude, is not precisely controlled. Engine power is significantly affected by a number of parameters such as air temperature, mixture strength, exhaust pressure, in addition to inlet pressure. A change in any one of these parameters for a given inlet pressure produces different power outputs. As a result, a rough control of engine power must be accepted or the control system must be made more complex to compensate for these variables.

Accordingly, it is an object of the present invention to provide a highly precise stable and simplified control system for an internal combustion engine which has means for pressurizing the inlet air delivered thereto to maintain engine power irrespective of ambient pressure variations.

In the broader aspects of the invention the above objects are achieved by providing a control system for an air-breathing internal combustion engine. The engine has a rotary output shaft means and means for variably pressurizing inlet air delivered to the engine for maintaining the power output of the engine at given levels irrespective of variations in ambient air pressure. The control system comprises means responsive to the torque output of the rotary output shaft means for generating a control signal. Means responsive to the control signal are provided for controlling the rate of operation of the air pressurizing means. Therefore the pressure of the inlet air is rapidly changed to precisely maintain the given power output.

It is a further and more specific object of the invention to provide an improved torque meter which is particularly adapted for use in the above-described control system.

The above object is achieved by providing a torque meter for an internal combustion engine having a rotary output. The torque meter comprises a casing for housing the internal combustion engine. A first shaft is rotatably mounted in the casing and driven by the internal combustion engine. A second shaft is rotatably mounted in the casing and extends therefrom. First and second helical gears, respectively mounted on the first and second shafts, engage one another so that the second shaft is driven by the engine. The first helical gear is axially displaceable for a limited extent relative to the second gear and the first shaft.

Piston means are mounted on and rotatable with the first helical gear. Means are provided for forming in the casing a chamber in which the piston means is displaceable. Pump means are provided for delivering a supply of pressurized fluid to the chamber. Interconnecting shaft means are provided for rotatably driving the pump means, the interconnecting shaft means being rotatably mounted in the casing and extending through the chamber. Spline means are formed on the interconnecting shaft means and the piston means, thereby causing the shaft to be driven by the rotating piston means, the piston means being axially displaceable relative to the interconnecting shaft means. Passageway means extend through the interconnecting shaft means from the chamber to a low pressure source.

The passageway means is positioned to form in cooperation with the piston means a variable area orifice for regulating a flow of fluid from the chamber whereby the pressure maintained in the chamber is proportional to the axial force component of the torque reaction between the helical gears. Means are provided for indicating the torque output of the engine as a function of the pressure in the chamber, this ouput being particularly useful for incorporation in the above-mentioned engine control system.

The above and other related objects and features of the present engine will be apparent from a reading of the description of the disclosure shown in the accompanying drawings and pointed out in the appended claims.

In the drawings:

FIGURE 1 is a highly simplified showing of an internal combustion engine together with a control system therefor which embodies the present invention.

FIGURE 2 is a simplified illustration of an alternative control system for the engine illustrated in FIGURE 1.

Figure 3:
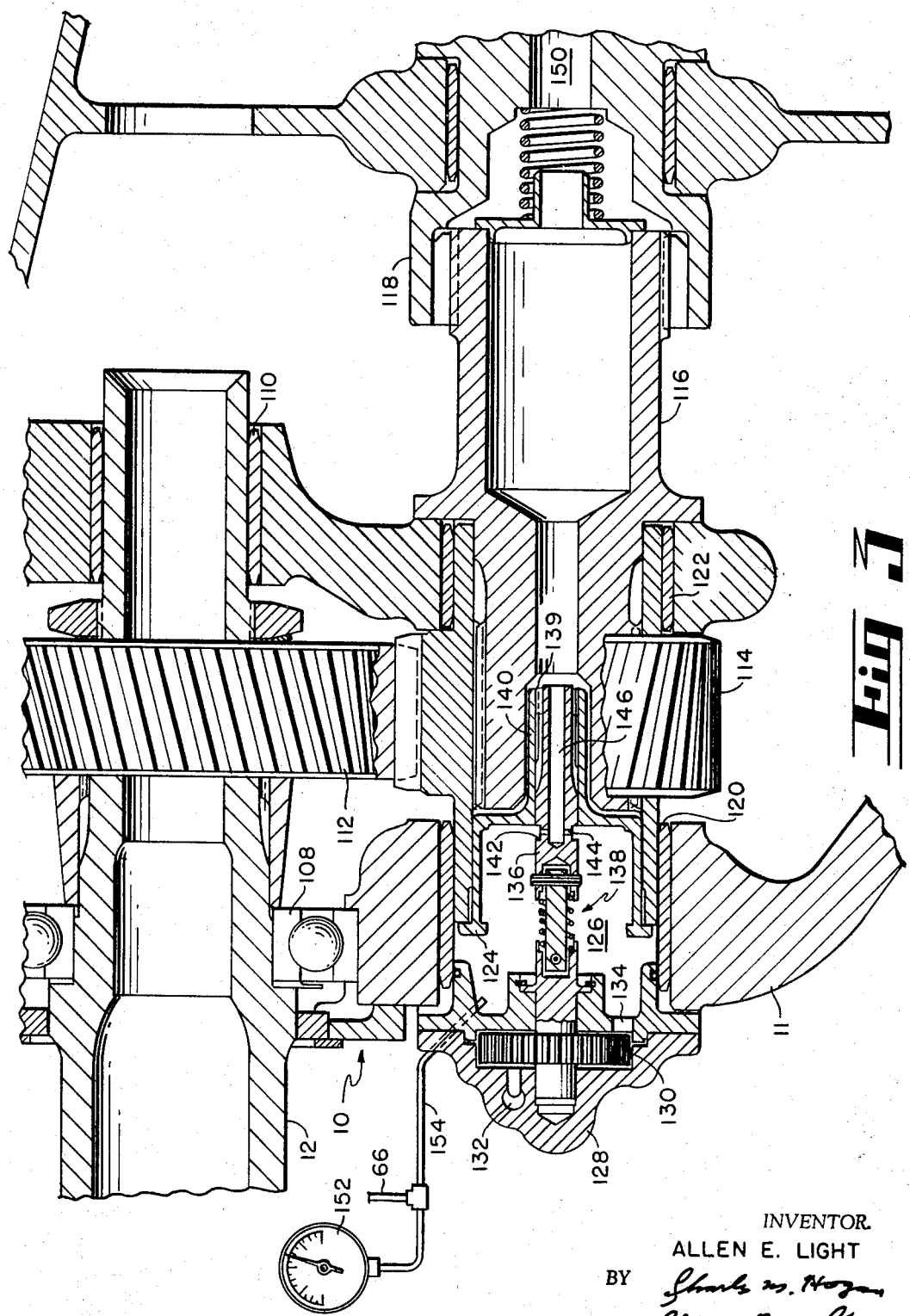
FIGURE 3 is a fragmentary longitudinal view of the engine shown in FIGURE 1, which particularly illustrates a torque meter which is incorporated in the control system embodying the present invention.

Reference is had to FIGURE 1 which illustrates an internal combustion engine 10 particularly suited for aircraft operation. The engine 10 has, journaled in a casing 11, a rotary output shaft 12 which drives a propeller 14 used in the propulsion of an aircraft. The engine 10 has an induction system, comprising an inlet manifold 16, which receives a controlled fuel-air mixture from an inlet conduit 18. A metering device 19, positioned in the inlet conduit 18, controls the flow of air to the inlet manifold and injects an appropriate amount of fuel to achieve an optimum fuel air ratio. The metering device 19 varies the fuel-air charge to the inlet manifold in accordance with movement of an operator controlled power lever 50. The fuel-air mixture passes to a plurality of cylinders 20 in which the mixture is ignited by suitable means to reciprocate pistons (not shown) and drive the output shaft 12. The hot gases of combustion are discharged from the cylinders 20 through exhaust manifolds 22 and 24. These exhaust manifolds are connected to a common conduit 26 which extends to the inlet of a turbocharger 28. A bypass conduit 44 provides a flow path from the conduit 26 to a final outlet conduit 46 extending from the turbocharger 28.

The turbocharger 28 comprises a turbine 30 journaled in a housing 31 to be driven by the flow of exhaust gases from the conduit 26. An interconnecting shaft 32 extends to a compressor impeller 34, also journaled in the housing 31 to receive air from an inlet 36 and pressurize it for delivery to the inlet conduit 18. The rate of operation of the turbine 30 is controlled by a valve 42 positioned in the conduit 44 to vary the amount of gases bypassed around the turbine 30.

During normal operation of the engine 10 the rate of operation of the engine is controlled by the power lever 50. The turbocharger 28 is driven by the exhaust gases from the engine 10 to pressurize air delivered to the inlet conduit 18 and provide a greater mass of air delivered to the cylinders 20. The rate of operation of the turbocharger turbine wheel 30 and hence the degree of pressurization of the inlet air by the compressor impeller 34 is varied by a control system described below.

The control system comprises an engine driven pump 52 which pressurizes fluid, such as lubricating fluid, supplied to the pump inlet from a storage tank 70 via an inlet conduit 72. As herein illustrated, the pump 52 and tank are separate from the engine 10 for the sake of clarity. However, the pump 52 and tank 70 would normally be integral parts of the engine lubrication system for simplicity. In some engines, the function of the tank 70 would be performed by a sump chamber positioned in the bottom of the engine housing 11.

The pressurized fluid from the pump 52 passes through a conduit 54 to a chamber 56 in an actuator 48. The chamber 56 is formed in part by a piston 58 mechanically connected to the bypass valve 42 through a linkage 61. The pressurized fluid in the chamber 56 acts on the piston 58 to urge the valve 42 to a closed position and a spring 60 acts on the piston 58 to urge the valve 42 to an open position. A discharge conduit 62 extends from the chamber 56 to an inlet of a control valve 64. The control valve 64 regulates the flow of fluid from the chamber 56 to the tank 70 via a conduit 68 to control the pressure in chamber 56 and hence the position of valve 42.

The control valve 64 comprises a spool valve element 86 displaceable in a bore 78 which is formed in a valve housing 74. An inlet port 76 and a first annular groove 77 provide a flow path for fluid from conduit 62 to the bore 78. A second annular groove 83 and an outlet port 84 provide a flow path for fluid from the bore 78 to return conduit 68. A land 80 on the spool valve 86 cooperates with the annular inlet groove 77 to form a variable area orifice, the area of which is determined by the displacement of the spool valve 86.

A spring 92 abutting an adjustable threaded end cap 98 acts on the spool valve 86 in a direction to reduce the flow into bore 78. This increases the pressure in chamber 56 and causes valve 42 to close. Pressurized fluid is supplied to the opposite end of the valve 86 by a torque meter 104 via a conduit 66 and inlet port 94. As will be later shown, the torque meter 104 generates a pressure signal directly proportional to the torque output of the engine 10. This torque pressure signal acts on the valve 86 to increase the flow into bore 78 and decrease the pressure in chamber 56, thus causing valve 42 to open and reduce the rate of operation of the turbocharger 28. It can be seen that the opening of valve 42 is controlled as a function of the difference between the torque pressure signal from torque meter 104 and the force exerted by the spring 92. As a result, the pressurization of the inlet air supplied to the engine 10 is controlled to maintain a predetermined torque output as set by the force exerted by spring 92. The end cap 98 may be adjusted to select the force exerted by the spring 92 and the level of torque produced by the engine.

The torque level maintained by the control system may also be variable, as illustrated in FIGURE 2. Only those portions of the control system affected by the modification are shown. The force of the spring 92' which determines the torque level, is varied by a plunger 102 acting on the spring 92' and a cam 103. The cam 103 is rotated in response to movement of the power lever 50' through a suitable mechanical interconnection. The cam 103 is so shaped so that as the power lever 50' is retarded, the torque level maintained by the control system is reduced.

Reference is now had to FIGURE 3 which illustrates in detail the torque meter 104 which supplies the torque pressure signal for the control system. The torque meter 104 is positioned in the forward portion of the engine housing 11. The output shaft 12 is journaled in the casing 11 by means of a thrust bearing 108 and a sleeve bearing 110. The output shaft 12 has splined thereon a helical gear 112. The helical gear 112 engages a corresponding helical pinion gear 114 which is splined onto a hollow shaft 116, secured to a crankshaft 118 of the internal combustion engine. The helical pinion gear 114 is journaled for rotation by a pair of sleeve bearings 120 and 122. The helical pinion gear 114 rotates with the shaft 116 but is free to displace axially to a limited extent relative to the helical gear 112 and the shaft 116. A cup 124 is pressed into the end of the rotatable helical pinion gear 114 to form a piston which is displaceable in a chamber 126, defined in part by the sleeve bearing 120 and by a removable oil pump casing 128.

The pump casing 128 houses a pump assembly 130 which may be a gear type, as shown, or other type capable of producing a relatively high stable output pressure. The pump 130 receives a supply of fluid from an inlet passageway 132 (generally connected to the engine lubrication system) and pressurizes it for delivery into the chamber 126 through discharge passageway 134. The pump 130 is driven by an interconnecting shaft 136 which is secured thereto by a suitable universal coupling 138. The interconnecting shaft 136 is driven by the piston cup 124 through a splined end 139 which rides in a splined tubular extension 140 of the cup 124. Sufficient clearance in the splines is provided to permit displacement of the piston cup 124 and the helical pinion gear 114 relative to the shaft 136.

The interconnecting shaft 136 has a passageway therethrough from the chamber 126 by means of an annular groove 142, passageways 144 and a longitudinal passageway 146. As is apparent, the displacement of the piston cup 124 and the helical gear 114 relative to the gear 112 and the shaft 116 causes the area of an orifice, formed by the annular groove 142 and the base of the cup 124, to vary. The fluid discharged through the passageway 146 is carried through the hollow interior of the shaft 116 and through a hollow passageway 150 in the engine crankshaft to the low pressure sump chamber for the engine lubrication system.

In operation the engine crankshaft 118 rotates, causing the pinion gear 114 to drive the gear 112 and the output shaft 12 of the engine. As the gears 112 and 114 drive one another the torque produced by the engine crankshaft 118 is reflected in a torque reaction force between the gears. Because the gears are formed in a helix there is an axial reaction force which acts to urge gear 114 towards the oil pump 130. The pressurized fluid discharged into the chamber 126 by the pump 130 acts to oppose this axial component of the torque reaction. As the gear 114 is displaced towards the oil pump 130, the base of the cup 124 acts to restrict the flow through the annular groove 142 and control the pressure in chamber 126 to a level which equalizes the force exerted on the gear 114 by the axial force component of the torque reaction. The pressure thus generated in the chamber 126 is directly proportional to the output torque produced by the engine 10. This output pressure signal may be connected via conduit 154 to a pressure gauge 152, calibrated to produce a usable reading of torque, or it may be conveniently connected via conduit 66 to the turbocharger control system illustrated in FIGURE 1.

The torque meter described above is particularly suited for application with this control system because it is a highly compact arrangement, easily adapted to use in the drive system of the internal combustion engine 10. By utilizing the piston 124 to balance the axial component of the torque reaction between the gears 112 and 114 the necessity of providing an axial thrust bearing for the gear 114 is eliminated, thereby minimizing the weight of the engine 10. In addition to this advantage, the pump 130 and the interconnecting shaft 136 may be removed from the casing 11 as a unit which greatly facilitates inspection of the groove 142 and passageways 144 which make up the metering orifice for the torque meter assembly. Because the axial component of the torque reaction is relatively high, the torque meter pressure signal which reflects this value has an inherently high gain. By providing a high gain input control signal the operation of the control system is greatly stabilized.

The use of torque as a control parameter for the turbocharger produces significant performance benefits. By controlling engine power directly through output torque, a significantly more accurate control system results. The many variables that can act on an indirect parameter, such as inlet pressure, do not have to be compensated for, thus resulting in a greatly simplified system.

By utilizing torque output of the engine 10 to control pressure level of the inlet air, the control system also automatically reduces the pressure level for intermediate operating levels. This is so because while the engine torque output is maintained at a fixed level, the inlet pressure necessary to achieve that torque at a lower operating level is reduced because of the lower r.p.m. of the engine. As a result, the tendency of the turbocharger 28 to over boost the engine at intermediate operating conditions is minimized, if not eliminated. If the engine torque output is controlled as a scheduled function of the power lever position as shown by the control system of FIGURE 2, the pressurization of the inlet air may be exactly tailored to the requirements of the engine to enable optimum performance.

Having thus described the invention, what is claimed as novel and desired to be secured by Letters Patent of the United States is:

1. A torque meter for an internal combustion engine providing a rotary output, said torque meter comprising:
 a casing for housing said internal combustion engine,
 a first shaft rotatably mounted in said casing and driven by said internal combustion engine,
 a second shaft rotatably mounted in said casing and extending therefrom,
 first and second helical gears respectively mounted on said first and second shafts and meshing so that said second shaft is driven by said engine,
 said first helical gear being axially displaceable for a limited extent relative to said second gear and said first shaft,
 piston means mounted on and rotatable with said first helical gear,
 means for forming a chamber in said casing in which said piston means is displaceable,
 pump means for delivering a supply of pressurized fluid to said chamber,
 interconnecting shaft means for rotatably driving said pump means,
 said interconnecting shaft means being rotatably mounted in said casing and extending through said chamber,
 spline means formed on said interconnecting shaft means and said piston means thereby causing said shaft to be driven by said rotating piston means,
 said piston means being axially displaceable relative to said interconnecting shaft means,
 passageway means extending through said interconnecting shaft from said chamber to a low pressure source, said passageway means being positioned to form in cooperation with said piston means a variable area orifice for regulating the flow of fluid from said chamber whereby the pressure maintained in said chamber is proportional to the axial force component of the torque reaction between said helical gears,
 means for indicating the torque output of said engine as a function of the pressure in said chamber.

2. Apparatus as in claim 1 wherein said engine has a lubrication system including means for pressurizing lubricating fluid, and wherein:
 said chamber means comprises a sleeve bearing mounted in said casing and positioned so that said piston means is guided for movement thereby,
 said torque meter further comprises passageway means providing a flow path for pressurized lubricating fluid from said engine lubrication system to the interface between said piston means and said sleeve bearing,
 whereby the resistance to movement of said piston in said sleeve bearing is minimized.

3. Apparatus as in claim 2 wherein:
 said shaft means is connected to said pump means,
 said pump means is removably secured to said casing so that said pump means and said shaft means may be removed as a unit.

4. Apparatus as in claim 3 wherein:
 said internal combustion engine has a sump chamber for accumulation of lubricating fluid from said lubrication system,
 said pump means supplies lubricating fluid to said chamber,
 said passageway means extends through said interconnecting shaft and through said first shaft to said sump chamber.

5. Apparatus as in claim 4 wherein:
 said interconnecting shaft means includes a flexible joint between said pump means and said spline means.

6. Apparatus as in claim 1 in combination with:
 means for varying the torque output of said engine, said means comprising a turbocharger adapted to be driven by the exhaust gases of said engine for pressurizing inlet air delivered to said engine, and actuating means for varying the rate of operation of said turbocharger,
 means responsive to the pressure in said torque meter chamber for controlling said actuating means to vary the rate of operation of said turbocharger, whereby the pressurization of the inlet air for said engine is controlled as a function of engine torque.

References Cited
UNITED STATES PATENTS

| | | | |
|---|---|---|---|
| 2,386,367 | 10/1945 | Taylor | 73—136 |
| 2,684,591 | 7/1954 | Lundquist | 73—136 |
| 2,776,720 | 1/1957 | Reggio | 123—119 |
| 2,783,645 | 3/1957 | Hornbostel | 73—136 |

FOREIGN PATENTS 624,301  1/1936  Germany.

CARLTON R. CROYLE, *Primary Examiner.*
DOUGLAS HART, *Assistant Examiner.*

U.S. Cl. X.R.

73—136; 123—119